(12) United States Patent
Kamath et al.

(10) Patent No.: US 11,693,669 B2
(45) Date of Patent: Jul. 4, 2023

(54) DEPLOYING SERVICE CONTAINERS IN AN ADAPTER DEVICE

(71) Applicant: HEWLETT PACKARD ENTERPRISE DEVELOPMENT LP, Houston, TX (US)

(72) Inventors: Harish Bantwal Kamath, Bengalooru (IN); Thomas Lewis Vaden, Neshanic Station, NJ (US); William Norwood Scherer, III, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 283 days.

(21) Appl. No.: 16/878,844

(22) Filed: May 20, 2020

(65) Prior Publication Data

US 2021/0004245 A1 Jan. 7, 2021

(30) Foreign Application Priority Data

Jul. 2, 2019 (IN) .............................. 201941026537

(51) Int. Cl.

| G06F 9/00 | (2006.01) |
|---|---|
| G06F 9/24 | (2006.01) |
| G06F 15/177 | (2006.01) |
| G06F 9/445 | (2018.01) |
| G06F 9/455 | (2018.01) |
| G06F 9/50 | (2006.01) |
| H04L 49/00 | (2022.01) |

(52) U.S. Cl.
CPC ...... *G06F 9/44505* (2013.01); *G06F 9/45558* (2013.01); *G06F 9/5027* (2013.01); *G06F 9/5077* (2013.01); *H04L 49/70* (2013.01); *G06F 2009/45595* (2013.01)

(58) Field of Classification Search
CPC .................... G06F 9/44505; G06F 9/45558
See application file for complete search history.

(56) References Cited

U.S. PATENT DOCUMENTS

| 8,225,018 B1 | 7/2012 | Sonksen et al. |
| 9,674,090 B2 | 6/2017 | Caulfield et al. |
| 10,187,323 B2 * | 1/2019 | Laplanche ............ G06F 9/5072 |
| 10,338,958 B1 * | 7/2019 | Kamboj ................ G06F 9/3851 |

(Continued)

OTHER PUBLICATIONS

Firestone et al., "Azure Accelerated Networking: SmartNICs in the Public Cloud", NSDI, 2018, 14 pages.

(Continued)

*Primary Examiner* — Mohammed H Rehman
(74) *Attorney, Agent, or Firm* — Trop, Pruner & Hu, P.C.

(57) ABSTRACT

In one implementation, an adapter device includes a processor and a storage medium including instructions. The instructions are executable by the processor to: deploy a composer container in the adapter device, wherein the adapter device is coupled to a host device; receive, by the composer container, a plurality of adapter service requests from the host device; and in response to the plurality of service requests, deploy, by the composer container, a plurality of service containers in the adapter device, wherein each service container is to provide a particular adapter service to the host device, and wherein each service container is allocated a subset of the plurality of computing resources of the adapter device.

20 Claims, 6 Drawing Sheets

(56) References Cited

U.S. PATENT DOCUMENTS

| | | | |
|---|---|---|---|
| 2014/0278623 A1* | 9/2014 | Martinez | G06Q 10/06 |
| | | | 705/7.12 |
| 2016/0330075 A1* | 11/2016 | Tiwari | H04L 41/0806 |
| 2017/0054593 A1* | 2/2017 | Borikar | H04L 49/35 |
| 2017/0250953 A1 | 8/2017 | Jain et al. | |
| 2018/0081565 A1* | 3/2018 | Tan | G06F 3/0656 |
| 2020/0201624 A1* | 6/2020 | Halder | G06F 11/1451 |
| 2020/0363985 A1* | 11/2020 | Gokam | G06F 3/0611 |
| 2021/0034552 A1* | 2/2021 | Gokam | G06F 3/0607 |

OTHER PUBLICATIONS

Marvell, "LiquidIO II Smart NICs", available online at <https://web.archive.org/web/20191026130157/https://www.marvell.com/ethernet-adapters-and-controllers/liquidio-smart-nics/index.jsp>, Oct. 26, 2019, 3 pages.

Netronome, "Agilio FX SmartNIC", available online at <https://www.netronome.com/products/agilio-fx/>, 2020, 6 pages.

* cited by examiner

DEPLOYING SERVICE CONTAINERS IN AN ADAPTER DEVICE

BACKGROUND

A computing system can include any number of computing devices and components. For example, a server system may include multiple computing devices, networking devices, storage devices, power supply components, and so forth. Each computing device may include hardware components, such as processors, memory (e.g., dynamic random access memory (DRAM), static random-access memory (SRAM), etc.), storage (e.g., hard drives, flash storage, optical disks, etc.), network interface devices, user input devices, power supply devices, display devices, and so forth.

BRIEF DESCRIPTION OF THE DRAWINGS

One or more example implementations are described with respect to the following figures.

DETAILED DESCRIPTION

Some computing devices may be coupled to an adapter that provides additional functionality. For example, a host server may include a network adapter (e.g., a network interface card) that allows the host server to communicate with remote devices via a communication network (e.g., an Ethernet network). In some examples, adapters may include components to provide processing functionality to the host server. As used herein, "smart adapter" refers to an adapter device that is configured to couple to a host, and to provide processing functionality to the host. Some smart adapters may provide multiple processing functions or services to the host. However, some smart adapters may not allow a user to configure and/or customize the processing functions to the host.

As described further below with reference to FIGS. 1-6, some implementations may include a smart adapter using containers to provide processing functions to a host. The smart adapter may include computing resources (e.g., processor, memory, storage, accelerators, etc.) that can execute multiple containers. As used herein, "container" refers to an isolated computing environment that is executed by a smart adapter. In some implementations, the containers in a smart adapter may include a composer container and any number of service container. In some implementations, the composer container may receive a user request to compose a specific service. In response to the received request, the composer container may determine whether the adapter device has sufficient computing resources to support a service container to provide the requested adapter service. If so, the composer container may allocate a portion of the computing resources to the service container, and may deploy the service container in the adapter device. Further, the composer container may track and allocate computing resources of the smart adapter to multiple service containers. In some implementations, such services may allow the host to offload processing to the smart adapter, thereby improving host performance and flexibility. Further, some implementations may allow the service containers to be isolated from each other, thereby improving security of offloaded services.

Figure 1:
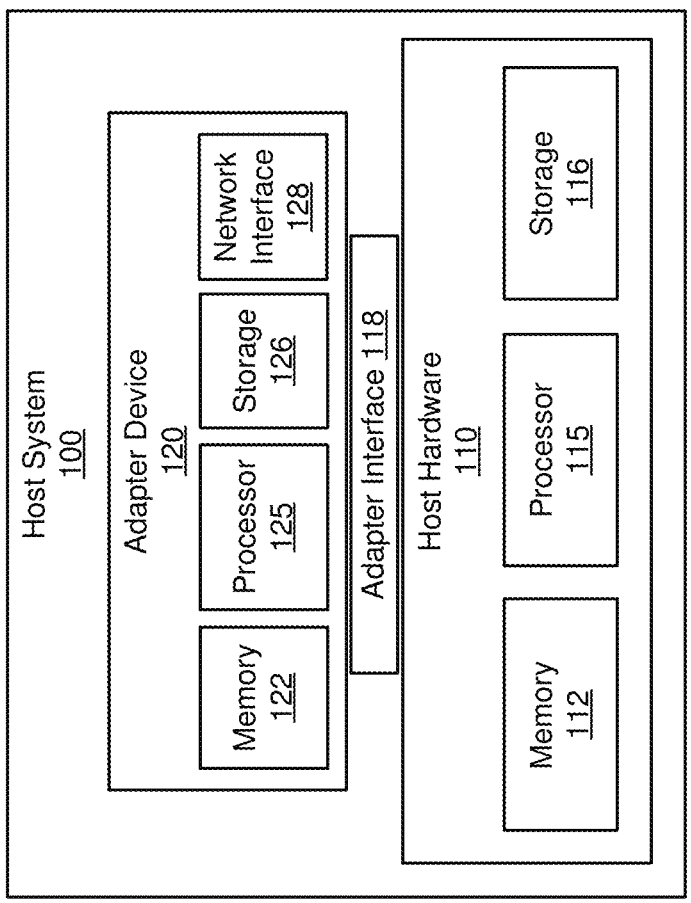
FIG. 1 is a schematic diagram of an example system, in accordance with some implementations.

FIG. 1 is a schematic diagram of an example host system 100, in accordance with some implementations. In some implementations, the host system 100 may be a computing device (e.g., a server, an appliance, etc.) that includes host hardware 110. As shown, the host hardware 110 may include memory 112, a processor 115, and storage 116. The memory 112 may be any type of computer memory (e.g., dynamic random access memory (DRAM), static random-access memory (SRAM), etc.). The processor 115 may include a microprocessor, a microcontroller, a processor module or subsystem, a programmable integrated circuit, a programmable gate array, multiple processors, a microprocessor including multiple processing cores, or another control or computing device. In some implementations, the storage 130 may include non-transitory machine-readable storage media such as hard drives, flash storage, optical disks, etc.

In some implementations, the host system 100 may include an adapter interface 118 to couple to an adapter device 120. The adapter interface 118 may provide the adapter device 120 with electrical power from the host system 100, and may provide data communication to/from the host system 100. For example, in some implementations, the adapter interface 118 may provide a local computer bus (e.g., a Peripheral Component Interconnect (PCI) bus). Further, in some implementations, the adapter interface 118 may be implemented in a physical bus slot or receptacle of the host system 100. In some implementations, when the adapter device 120 is coupled to the adapter interface 118, the adapter device 120 may be contained within a housing or enclosure of the host system 100.

As shown in FIG. 1, the adapter device 120 may include memory 122, a processor 125, storage 126, and a network interface 128. The memory 122, processor 125, storage 126 may be similar or equivalent to the memory 112, a processor 115, and storage 116 described above. The network interface 128 may provide connectivity to a communication network (e.g., an Ethernet network, a local wireless network, a cellular telephone network, and so forth).

In some implementations, when coupled to the adapter interface 118, the adapter device 120 may provide one or more adapter services to the host system 100. As used herein, an "adapter service" refers to a particular processing service or function provided by an adapter device to a coupled host device. For example, the adapter device 120 may provide the host system 100 with one or more adapter services such as network connectivity, storage connectivity, video/graphics acceleration, cryptographic processing, telemetry, system management, packet processing, and so forth.

In one or more implementations, the adapter device 120 may implement each adapter service in a discrete service container. As used herein, a "service container" refers to an isolated computing environment that is executed to provide a particular adapter service. In some implementations, the adapter device 120 may execute a composer container to deploy any number of service containers. An example implementation of an adapter device 120 using a composer container and one or more service containers is described below with reference to FIGS. 2-3.

In one or more implementations, a composer container may be a specialized container that manages allocations of resources of the adapter device 120 to various service containers. The composer container may control operating characteristics of the service containers. For example, in some implementations, the composer container may specify each service container as one of three service container types, namely a device type, a host type, and a service endpoint type. Such types may determine how service containers are exposed to (or appear to) the host system 100. For example, in some implementations, the device type of service container may be perceived by the host system 100 as a particular type of peripheral device (e.g., a storage device, a network switch, a network interface card (NIC), and so forth). The host type of service container may be perceived by the host system 100 as a remote or peer computing device (e.g., a server, a desktop, etc.). The service endpoint type of service container may be perceived by the host system 100 as the access point for a particular computing service (e.g., an address for a given web service, a Representational State Transfer (REST) interface, etc.).

Note that, while FIG. 1 shows example implementations of the host system 100 and the adapter device 120 that include particular components, other implementations are possible. For example, it is contemplated that the host system 100 and/or the adapter device 120 may include additional components, different components, fewer components, and so forth. In some examples, the adapter device 120 may include any number of processors, graphics accelerators, math accelerators, encryption accelerators, network interfaces, bus interfaces, storage devices, field-programmable gate array (FPGA) devices, and so forth.

Figure 2:
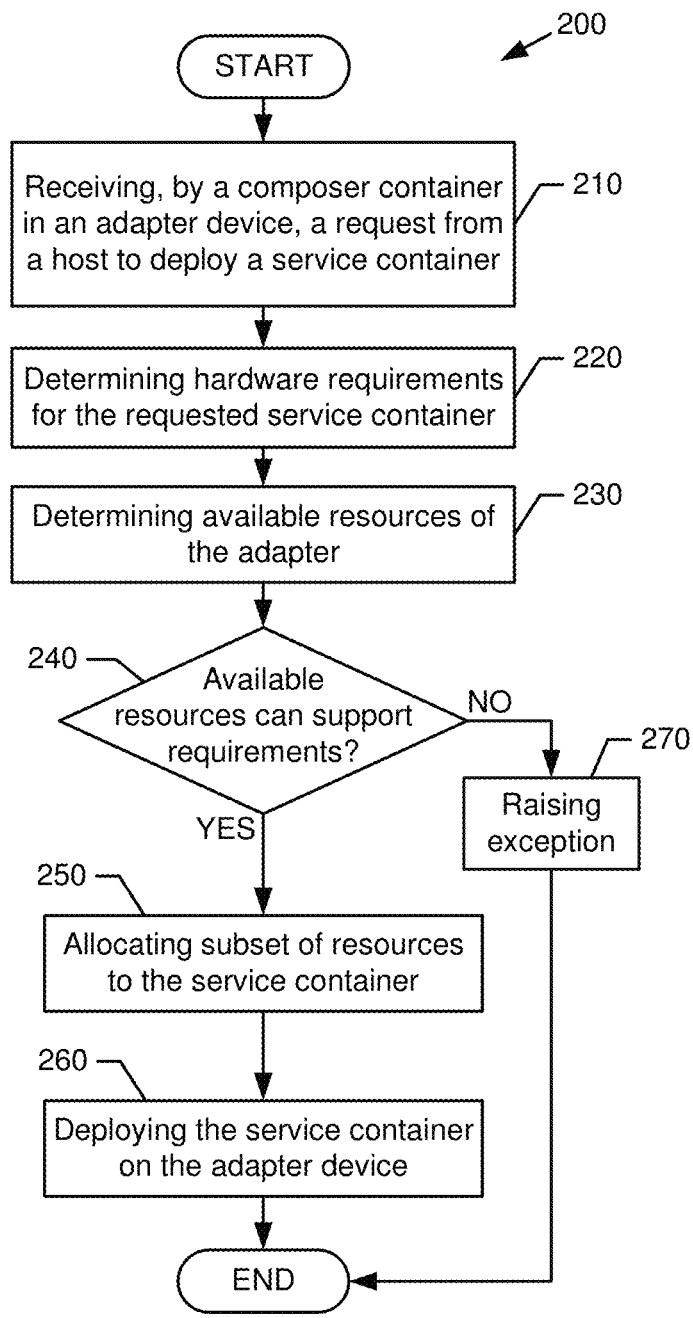
FIG. 2 is an illustration of an example process, in accordance with some implementations.

Referring now to FIG. 2, shown is a flowchart of an example configuration process 200, in accordance with some implementations. For the sake of illustration, details of the process 200 may be described below with reference to FIG. 3, which shows an example system 300 according to one or more implementations. One or more components shown in FIG. 3 may correspond generally to one or more components shown in FIG. 1. For example, the host device 310 may correspond generally to an example implementation of the host system 100, and the adapter device 320 may correspond generally to an example implementation of the adapter device 120. However, other implementations are also possible. The process 200 may be implemented in hardware or machine-readable instructions (e.g., software and/or firmware). The machine-readable instructions may be stored in a non-transitory computer readable medium, such as an optical, semiconductor, or magnetic storage device.

As shown in FIG. 2, block 210 may include receiving, by a composer container in an adapter device, a request from a host to deploy a service container. For example, referring to FIG. 3, a host device 310 may include a composer application 312, a composer driver 314, and a PCI bus driver 316. Further, an adapter device 320 may include a composer container 322 and multiple service containers 324A-324F (also referred to generally as service containers 324). Assume that a user interacts with the composer application 312 to specify a particular adapter service and/or service container. In response, the composer application 312 may generate a request 311 to deploy a service container 324 to provide the specified adapter service. In some implementations, the request 311 may be communicated to the composer container 322 of the adapter device 320 via the composer driver 314 and the PCI bus driver 316 of the host device 310. In some examples, the request 311 may be communicated at least in part using data formats such as JavaScript Object Notation (JSON), Extensible Markup Language (XML), Binary Encoded JSON (BEJ), and so forth. In some implementations, the functionality of the composer application 312 may be implemented in another device and/or software application (e.g., a remote system management device or application coupled to the adapter device 320 via the network 330).

Referring again to FIG. 2, block 220 may include determining hardware requirements of the requested service container. Block 230 may include determining the available resources of the adapter. Diamond 240 may include determining whether the available resource of the adapter can support the hardware requirements of the requested service container. For example, referring to FIG. 3, in response to the request 311, the composer container 322 may determine a type and amount of hardware resources of the adapter device 320 that would be required to implement the requested service container 324 (e.g., a required memory space, a required processing speed, and so forth). The composer container 322 may also determine the available resources of the adapter device 320 (e.g., by subtracting previous allocations to existing containers from the total amount(s) of resources of the adapter device 320). The composer container 322 may also determine whether the requirements of the requested service container can be supported by the available resources of the adapter device 320. In some implementations, the composer container 322 may maintain one or more stored data structures to track existing allocations of resources to containers (e.g., to the service containers 324 and the composer container 322), total resources, and so forth.

If it is determined at diamond 240 that the available resources of the adapter cannot support the requirements of the requested service container, then the process 200 may continue at block 270, including raising an exception. After block 270, the process 200 may be completed. For example, referring to FIG. 3, in response to determining that the requirements of the requested service container 324 cannot be supported by the available resources of the adapter device 320, the composer container 322 may generate an error message to indicate to the user that the requested service container 324 cannot be deployed on the adapter device 320.

However, if it is determined at diamond 240 that the available resources of the adapter can support the requirements of the requested service container, then the process 200 may continue at block 250, including allocating a subset of the adapter resources to the requested service container. Further, block 260 may include deploying the requested service container on the adapter device. After block 260, the process 200 may be completed. For example, referring to FIG. 3, in response to determining that the requirements of the requested service container 324 can be supported by the available resources of the adapter device 320, the composer container 322 may allocate a subset of the adapter resources to the requested service container 324, and may initiate execution of the requested service container 324 in the adapter device 320. In some implementations, the composer container 322 may coordinate the shared use of adapter resources across multiple service containers 324. For example, the composer container 322 may assign portions of specific resources (e.g., central processing unit (CPU) cores or bandwidth, network interface bandwidth, graphics processing unit (GPU) cores or bandwidth, cryptographic accelerator unit, etc.) to various service containers 324 in specific time slices, time ranges, and so forth.

In one or more implementations, the composer container 322 may control the service container type and other operating characteristics of each deployed service container 324 based on the request 311. For example, the service container 324A may be deployed as a device type container that is allocated a single CPU core and an amount of network bandwidth, and that provides a virtual NIC to connect the host device 310 to the network 330. In a second example, the service container 324B may be deployed as a service endpoint type that is allocated two CPU cores, and that provides a particular web service to the host device 310. In a third example, the service container 324C may be deployed as a device type that is allocated one CPU core and two GPU cores, and that provides a network switch service to the host device 310. In a fourth example, the service container 324D may be deployed as a host type that is allocated one CPU core and a cryptographic accelerator unit, and that provides encryption and/or decryption services to the host device 310. In a fifth example, the service container 324E may be deployed as a device type that is allocated one CPU core and seven GPU cores, and that provides a non-volatile memory express (NVMe) storage service to the host device 310. In a sixth example, the service container 324F may be deployed as a device type container that is allocated two CPU cores and five GPU cores, and that provides a storage device with data de-duplication to the host device 310. Further, in some examples, a single service container 324 may provide multiple adapter services to the host device 310.

In one or more implementations, the service containers 324 may be maintained in isolation from each other. For example, the service container 324A may not have access to internal data of the service container 324B, and vice-versa. Further, the service container 324C may not have access to communications between the host device 310 and the service container 324D, and vice-versa. In this manner, the data security of various adapter services provided by the adapter device 320 may be improved. Further, the probability that a service container 324 that is configured or implemented incorrectly will affect other service containers 324 may be reduced. Furthermore, such isolation between the service containers 324 may reduce the damage and/or spread of malware that affects a particular service container 324.

Figure 3:
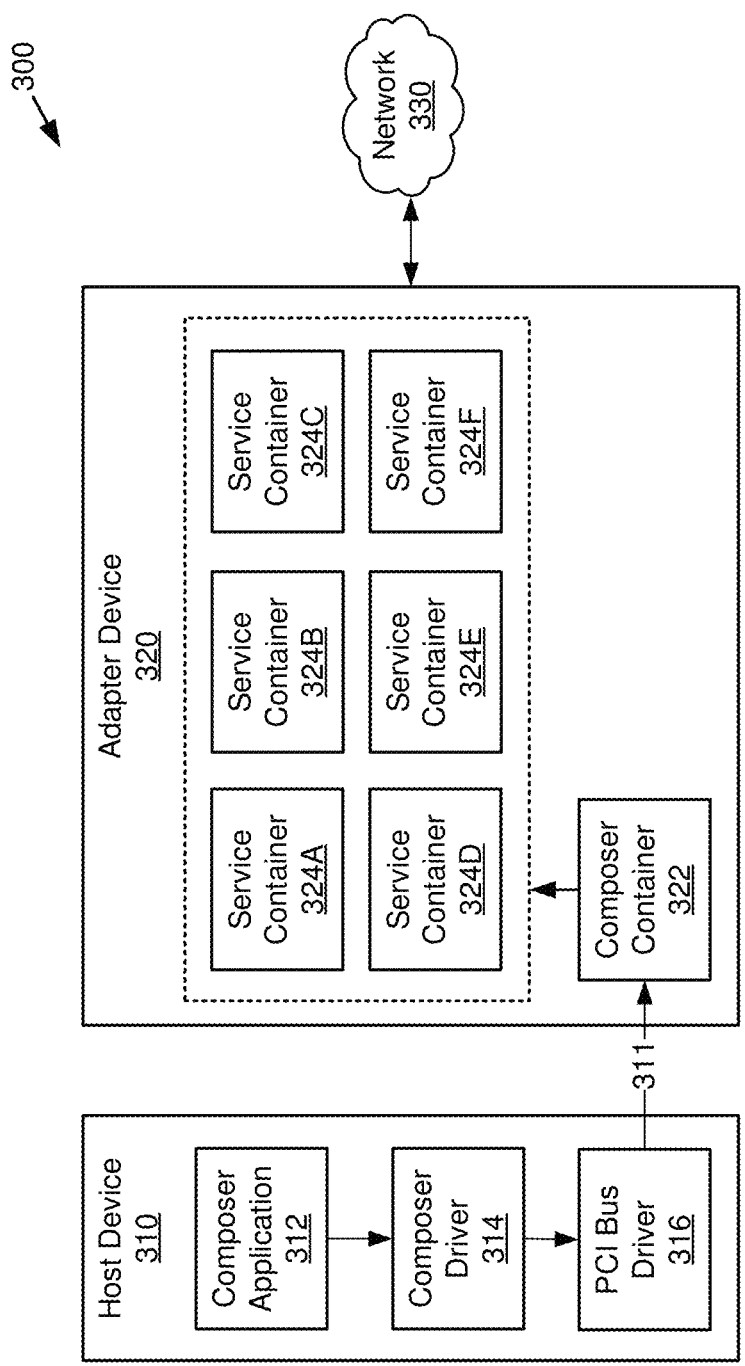
FIG. 3 is an illustration of an example system, in accordance with some implementations.

In one or more implementations, the service containers 324 may access computing resources of device(s) that are external to the adapter device 320 (not shown in FIG. 3). For example, the service container 324A may be allocated the processing bandwidth of a GPU device that is mounted in the host device 310 (e.g., in a different PCI slot). In another example, the service container 324B may be allocated the processing bandwidth of an FPGA device that is coupled to a bus interface of the adapter device 320 (e.g., a PCI slot of the adapter device 320). In some implementations, such external resources that are allocated to the adapter device 320 may be not be visible to the host device 310.

In some implementations, the adapter device 320 may include multiple network ports coupled to the network 330. In such implementations, a service container 324 may provide aggregation of network traffic to the host device 310. For example, the service container 324A may aggregate network traffic from multiple NVMe storage devices.

Figure 4:
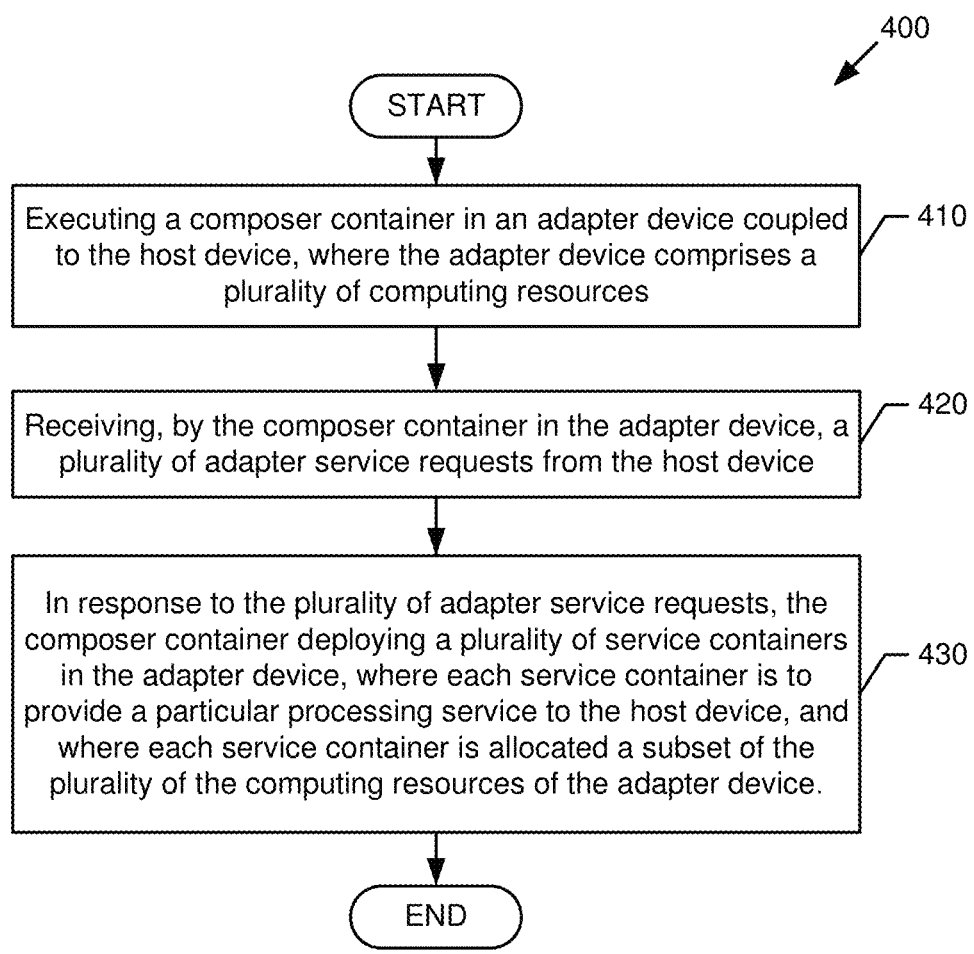
FIG. 4 is an illustration of an example process, in accordance with some implementations.

Referring now to FIG. 4, shown is a flowchart of an example process 400, in accordance with some implementations. For the sake of illustration, details of the process 400 may be described below with reference to FIGS. 1-3, which show example implementations. However, other implementations are also possible. The process 400 may be implemented in hardware (e.g., circuitry) or machine-readable instructions (e.g., software and/or firmware). The machine-readable instructions are stored in a non-transitory computer readable medium, such as an optical, semiconductor, or magnetic storage device.

As shown in FIG. 4, block 410 may include executing a composer container in an adapter device coupled to the host device, where the adapter device comprises a plurality of computing resources. For example, referring to FIG. 3, the composer container 322 may be executed by the adapter device 320. In some implementations, the adapter device 320 may include various computing resources (e.g., memory 122, processor 125, storage 126, and network interface 128 shown in FIG. 1).

Block 420 may include receiving, by the composer container in the adapter device, a plurality of adapter service requests from the host device. As used herein, an "adapter service request" is a request that causes a service container to be deployed in an adapter device. In some implementations, the adapter service request may specify characteristics of a service container. In other implementations, the adapter service request may specify characteristics of an adapter service that is implemented in a service container. For example, referring to FIG. 3, the composer application 312 in the host device 310 may generate a request 311 that causes a service container 324 to be deployed in the adapter device 320. In some implementations, the requests 311 may be communicated to the composer container 322 of the adapter device 320 via the composer driver 314 and the PCI bus driver 316 of the host device 310.

Block 430 may include, in response to the plurality of adapter service requests, the composer container deploying a plurality of service containers in the adapter device, where each service container is to provide a particular processing service to the host device, and where each service container is allocated a subset of the plurality of computing resources of the adapter device. For example, referring to FIG. 3, in response to the requests 311, the composer container 322 may determine a type and amount of computing resources of the adapter device 320 that would be required to implement each requested service container 324. The composer container 322 may determine the available computing resources of the adapter device 320 (e.g., based on one or more stored data structures, by subtracting previous allocations to existing containers from the total amount(s) of resources of the adapter device 320, and so forth). For each request 311, the composer container 322 may determine whether the requirements of the requested service container can be supported by the available computing resources of the adapter device 320. If so, the composer container 322 may allocate a subset of the adapter resources to the requested service container 324, and may initiate execution of the requested service container 324 in the adapter device 320. After block 430, the process 400 may be completed.

Figure 5:
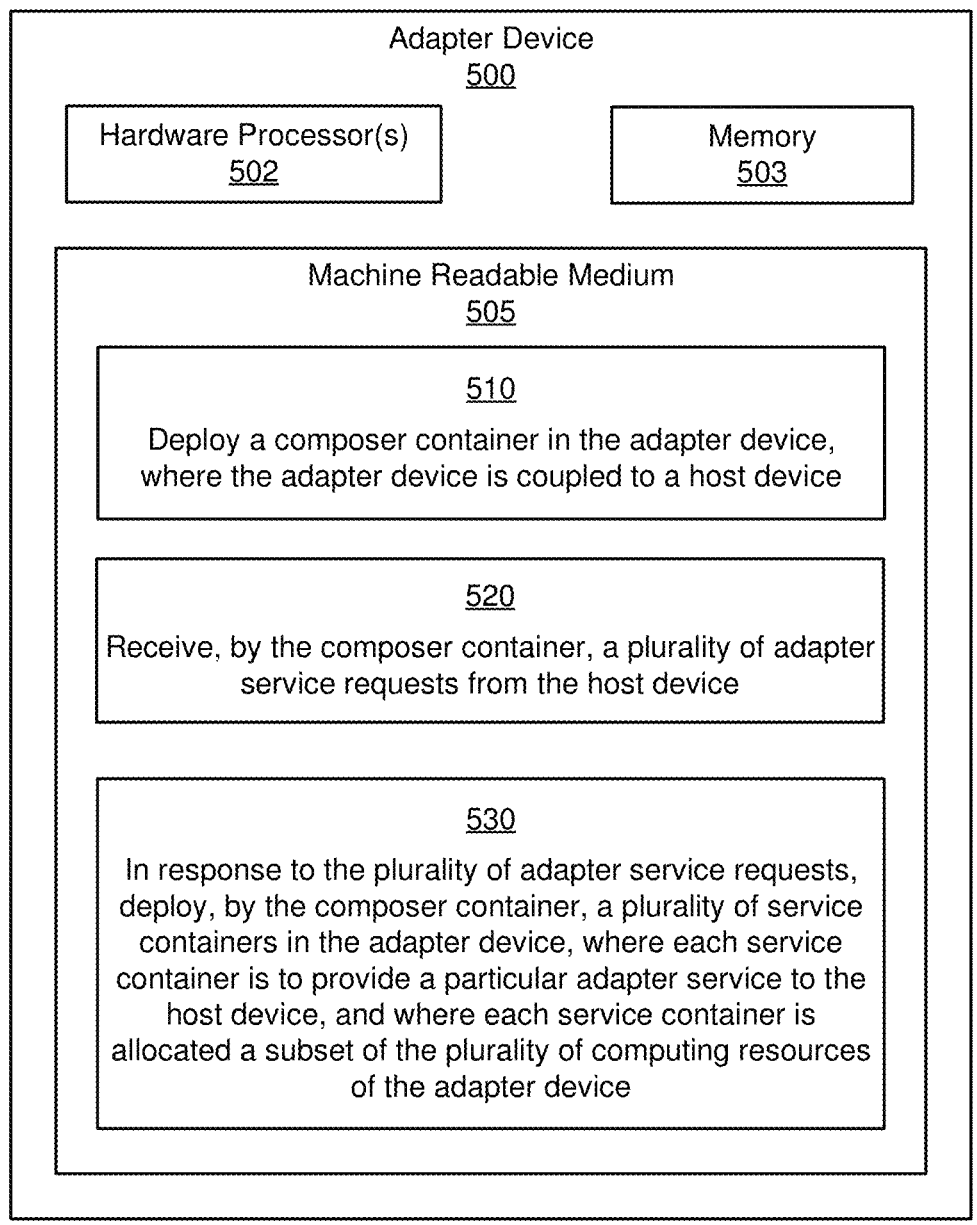
FIG. 5 is a schematic diagram of an example computing device, in accordance with some implementations.

Referring now to FIG. 5, shown is a schematic diagram of an example adapter device 500. In some examples, the adapter device 500 may correspond generally to the adapter device 120 (shown in FIG. 1) and/or the adapter device 320 (shown in FIG. 3). As shown, the adapter device 500 may include hardware processor(s) 502, memory 503, and a machine-readable storage medium 505 including instructions 510-530. The machine-readable storage medium 505 may be a non-transitory medium. Further, the adapter device 500 may include other computing resources (not shown), such as network interface(s), graphics accelerator(s), cryptographic accelerator(s), bus interface(s), a field-programmable gate array (FPGA), and so forth. The instructions 510-530 may be executable by the hardware processor(s) 502. For the sake of illustration, details of instructions 510-530 may be described below with reference to FIGS. 1-3, which show example implementations. However, other implementations are also possible.

The hardware processor(s) 502 may include a general purpose microprocessor, a specialized controller, a processor module or subsystem, a programmable integrated circuit, a programmable gate array, multiple processors, a microprocessor including multiple processing cores, and so forth. The memory 503 may include any type of computer memory (e.g., dynamic random access memory (DRAM), static random-access memory (SRAM), etc.).

Instruction 510 may be executed to deploy a composer container in the adapter device, where the adapter device is coupled to a host device. For example, referring to FIG. 3, the adapter device 320 may execute the composer container 322, and may be coupled to the host device 310. In some implementations, the adapter device 320 may be coupled to a physical slot interface of the host device 310 (e.g., adapter interface 118 shown in FIG. 1). Further, in some implementations, the adapter device 320 may be enclosed within a housing of the host device 310.

Instruction 520 may be executed to receive, by the composer container in the adapter device, a plurality of adapter service requests from the host device. For example, referring to FIG. 3, the composer application 312 in the host device 310 may generate one or more requests 311 for adapter services in the adapter device 320. In some implementations, the requests 311 may be communicated to the composer container 322 of the adapter device 320 via the composer driver 314 and the PCI bus driver 316 of the host device 310.

Instruction 530 may be executed to, in response to the plurality of adapter service requests, deploy, by the composer container, a plurality of service containers in the adapter device, where each service container is to provide a particular adapter service to the host device, and where each service container is allocated a subset of the plurality of computing resources of the adapter device. For example, referring to FIG. 3, in response to the requests 311, the composer container 322 may determine a type and amount of computing resources of the adapter device 320 that would be required to implement each requested service container 324. The composer container 322 may determine the available computing resources of the adapter device 320. For each request 311, the composer container 322 may determine whether the requirements of the requested service container can be supported by the available computing resources of the adapter device 320. If so, the composer container 322 may allocate a subset of the adapter resources to the requested service container 324, and may initiate execution of the requested service container 324 in the adapter device 320.

Figure 6:
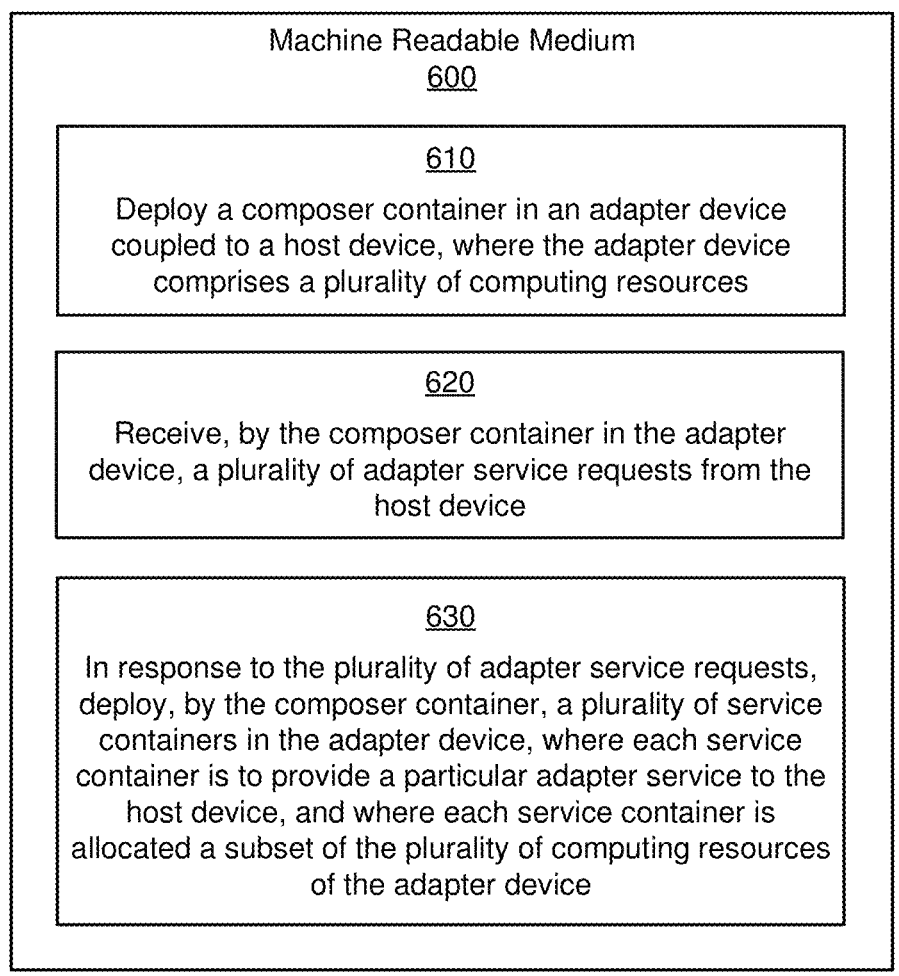
FIG. 6 is a diagram of an example machine-readable medium storing instructions in accordance with some implementations.

Referring now to FIG. 6, shown is machine-readable medium 600 storing instructions 610-630, in accordance with some implementations. The instructions 610-630 can be executed by one or more hardware processors. The machine-readable medium 600 may be a non-transitory storage medium, such as an optical, semiconductor, magnetic storage medium, non-volatile flash memory, and so forth. For the sake of illustration, details of instructions 610-630 may be described below with reference to FIGS. 1-3, which show example implementations. However, other implementations are also possible.

Instruction 610 may be executed to deploy a composer container in an adapter device coupled to a host device, where the adapter device comprises a plurality of computing resources. For example, referring to FIG. 3, the adapter device 320 may execute the composer container 322, and may be coupled to the host device 310. The adapter device 320 may include hardware computing resources (e.g., processor(s), memory, storage, network interface(s), graphics accelerator(s), cryptographic accelerator(s), bus interface(s), a field-programmable gate array (FPGA), etc.). In some implementations, the adapter device 320 may be coupled to a physical slot interface of the host device 310 (e.g., adapter interface 118 shown in FIG. 1). Further, in some implementations, the adapter device 320 may be enclosed within a housing of the host device 310.

Instruction 620 may be executed to receive, by the composer container in the adapter device, a plurality of adapter service requests from the host device. For example, referring to FIG. 3, the composer application 312 in the host device 310 may generate one or more requests 311 for adapter services in the adapter device 320. In some implementations, the requests 311 may be communicated to the composer container 322 of the adapter device 320 via the composer driver 314 and the PCI bus driver 316 of the host device 310.

Instruction 630 may be executed to, in response to the plurality of adapter service requests, deploy, by the composer container, a plurality of service containers in the adapter device, where each service container is to provide a particular adapter service to the host device, and where each service container is allocated a subset of the plurality of computing resources of the adapter device. For example, referring to FIG. 3, in response to the requests 311, the composer container 322 may determine a type and amount of computing resources of the adapter device 320 that would be required to implement each requested service container 324. The composer container 322 may determine the available computing resources of the adapter device 320. For each request 311, the composer container 322 may determine whether the requirements of the requested service container can be supported by the available computing resources of the adapter device 320. If so, the composer container 322 may allocate a subset of the adapter resources to the requested service container 324, and may initiate execution of the requested service container 324 in the adapter device 320.

In accordance with some implementations, examples may provide deployment of service containers in an adapter device. The adapter device may be a smart adapter including computing resources (e.g., processor, memory, storage, accelerators, etc.). The adapter device may execute a composer container that can receive a request for an adapter service. In response to the request, the composer container may determine whether the adapter device has sufficient computing resources to support a service container to provide the requested adapter service. If so, the composer container may allocate a portion of the computing resources to the service container, and may deploy the service container in the adapter device. In some implementations, the deployment of adapter services in service containers may allow the host to offload processing to the smart adapter, thereby improving host performance and flexibility. Further, some implementations may allow the service containers to be isolated from each other, thereby improving security of offloaded services.

Note that, while FIGS. 1-6 show various examples, implementations are not limited in this regard. For example, while not shown in each of FIG. 1-6, the devices described above may include additional components, such as memory (e.g., dynamic random access memory (DRAM)), processors, controllers, storage devices, buses, switches, batteries, antennas, display devices, input devices, power supplies, and so forth. In another example, while example implementations are described using a composer container and service containers, it is contemplated that other isolated computing environments or technologies may be used. For example, referring to FIG. 3, it is contemplated that the adapter device 320 may include a composer virtual machine (VM) and multiple service VMs. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An adapter device comprising:
   a processor; and
   a storage medium comprising instructions executable on the processor to:
   deploy a composer container in the adapter device;
   track, by the composer container, computing resources in the adapter device;
   receive, by the composer container, a plurality of adapter service requests from a host device coupled to the adapter device; and
   in response to the plurality of adapter service requests:
   allocate, by the composer container, respective subsets of the computing resources in the adapter device to corresponding service containers for the plurality of adapter service requests,
   initiate, by the composer container, execution of the corresponding service containers that are implemented using the respective subsets of the computing resources in the adapter device allocated to the corresponding service containers by the composer container, wherein the composer container comprises an isolated computing environment that is discrete from respective isolated computing environments of the service containers, and execute respective adapter services requested by the adapter service requests from the host device in the respective isolated computing environments of the service containers.

2. The adapter device of claim 1, wherein the composer container is to, for each respective service container of the service containers:
   determine requirements of the respective service container;
   determine available computing resources of the adapter device based on the tracking; and
   in response to a determination that the available computing resources of the adapter device can support the requirements of the respective service container, initiate execution of the respective service container on the adapter device.

3. The adapter device of claim 1, wherein the composer container is to configure a service container type of each service container of the service containers, and wherein the service container type is selected from a device type, a host type, and a service endpoint type.

4. The adapter device of claim 3, wherein a first service container of the service containers is deployed as a device type container that provides a virtual network interface card (NIC) to connect the host device to a network.

5. The adapter device of claim 4, wherein a second service container of the service containers is deployed as a host type container that provides an encryption service to the host device.

6. The adapter device of claim 5, wherein a third service container of the service containers is deployed as a service endpoint type container that provides a web service to the host device.

7. The adapter device of claim 1, wherein the computing resources of the adapter device comprise a processor, a graphics accelerator, a memory, and a network interface.

8. The adapter device of claim 1, wherein the instructions are executable on the processor to:
   for each respective adapter service request of the plurality of adapter service requests:
   determine a type of a computing resource and an amount of the computing resource based on requirements for the respective adapter service request,
   wherein the allocating of a respective subset of the computing resources to a respective service container is based on the determined type and amount of the computing resource.

9. The adapter service of claim 8, wherein the determining of the type of the computing resource comprises identifying a computing resource type selected from a processing resource, a network resource, and a storage resource.

10. A non-transitory machine-readable storage medium comprising instructions that upon execution cause an adapter device to:
    deploy a composer container in the adapter device coupled to a host device;
    track, by the composer container, computing resources in the adapter device;
    receive, by the composer container in the adapter device, a plurality of adapter service requests from the host device; and
    in response to the plurality of adapter service requests:
    allocate, by the composer container, respective subsets of the computing resources in the adapter device to corresponding service containers for the plurality of adapter service requests, initiate, by the composer container, execution of the corresponding service containers that are implemented using the respective subsets of the computing resources in the adapter device allocated to the corresponding service containers by the composer container, wherein each service container is to provide a particular adapter service to the host device, wherein the composer container comprises an isolated computing environment that is discrete from respective isolated computing environments of the service containers, and execute respective adapter services requested by the adapter service requests from the host device in the respective isolated computing environments of the service containers.

11. The non-transitory machine-readable storage medium of claim 10, wherein the instructions upon execution cause the adapter device to:

maintain, by the composer container, one or more stored data structures to track allocations of the respective subsets of the computing resources to the corresponding service containers.

12. The non-transitory machine-readable storage medium of claim 10, wherein the instructions upon execution cause the adapter device to:

determine, by the composer container, requirements of a respective service container of the service containers;

determine, by the composer container, available computing resources of the adapter device based on the tracking; and in response to a determination that the available computing resources of the adapter device can support the requirements of the respective service container, initiate execution, by the composer container, of the respective service container on the adapter device.

13. The non-transitory machine-readable storage medium of claim 10, wherein the instructions upon execution cause the adapter device to:

configure, by the composer container, a service container type of a first service container of the service containers, wherein the service container type is selected from a device type, a host type, and a service endpoint type.

14. The non-transitory machine-readable storage medium of claim 13, wherein the instructions upon execution cause the adapter device to:

allocate, by the composer container, a subset of available central processing unit cores and a subset of available graphics processing unit cores to the first service container.

15. The non-transitory machine-readable storage medium of claim 10, wherein the instructions upon execution cause the adapter device to:

for each respective adapter service request of the plurality of adapter service requests:
determine a type of a computing resource and an amount of the computing resource based on requirements for the respective adapter service request,
wherein the allocating of a respective subset of the computing resources to a respective service container of the service containers is based on the determined type and amount of the computing resource.

16. A method comprising:

executing a composer container in an adapter device coupled to a host device;

tracking, by the composer container, computing resources in the adapter device;

receiving, by the composer container in the adapter device, a plurality of adapter service requests from the host device; and in response to the plurality of adapter service requests:
allocating, by the composer container, respective subsets of the computing resources in the adapter device to corresponding service containers for the plurality of adapter service requests,
initiating execution of the corresponding service containers that are implemented using the respective subsets of the computing resources in the adapter device allocated to the corresponding service containers by the composer container, wherein the composer container comprises an isolated computing environment that is discrete from respective isolated computing environments of the service containers, and
executing respective adapter services requested by the adapter service requests from the host device in the respective isolated computing environments of the service containers.

17. The method of claim 16, comprising:

determining, by the composer container, requirements of a respective service container of the service containers;

determining, by the composer container, whether available computing resources of the adapter device can support the requirements of the respective service container; and in response to a determination that the available computing resources of the adapter device can support the requirements of the respective service container, initiating execution, by the composer container, of the respective service container on the adapter device.

18. The method of claim 16, comprising:

configuring, by the composer container, a service container type of a first service container of the service containers, wherein the first service container is deployed as a device type container that provides a storage device with data de-duplication to the host device.

19. The method of claim 16, comprising:

configuring, by the composer container, a service container type of a first service container of the service containers, wherein the first service container is deployed as a device type container that provides a non-volatile memory express (NVMe) storage device to the host device.

20. The method of claim 16, comprising:

for each respective adapter service request of the plurality of adapter service requests:
determining, by the composer container, a type of a computing resource and an amount of the computing resource based on requirements for the respective adapter service request,
wherein the allocating of a respective subset of the computing resources to a respective service container is based on the determined type and amount of the computing resource.

* * * * *